US012623493B2

(12) United States Patent
Korbas et al.

(10) Patent No.: US 12,623,493 B2
(45) Date of Patent: May 12, 2026

(54) TIRE TREAD FOR A TIRE AND TIRE AND CURING MOULD TO MANUFACTURE A TIRE TREAD

(71) Applicant: Continental Reifen Deutschland GmbH, Hannover (DE)

(72) Inventors: Mario Korbas, Predmier (SK); Ronald Daries, Charlotte, NC (US); Jens Kleffmann, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/912,064

(22) Filed: Oct. 10, 2024

(65) Prior Publication Data

US 2026/0103029 A1     Apr. 16, 2026

(51) Int. Cl.
| *B29D 30/56* | (2006.01) |
| *B60C 11/01* | (2006.01) |

(Continued)

(52) U.S. Cl.
CPC .............. B60C 11/01 (2013.01); B60C 11/02 (2013.01); *B29D 30/0606* (2013.01);
(Continued)

(58) Field of Classification Search
CPC ................................ B60C 11/01; B60C 11/02
See application file for complete search history.

(56) References Cited

U.S. PATENT DOCUMENTS

| 5,769,975 A | 6/1998 | Keys | |
| 2001/0050125 A1* | 12/2001 | Neises | .................... B60C 11/01 |
| | | | 152/209.12 |

(Continued)

FOREIGN PATENT DOCUMENTS

| EP | 0348335 A2 | 12/1989 | |
| EP | 0709237 A2 * | 5/1996 | ............... B60C 3/04 |

(Continued)

OTHER PUBLICATIONS

International Search Report and Written Opinion dated Mar. 6, 2026 of International Application PCT/EP2025/07866.

*Primary Examiner* — Cedrick S Williams
(74) *Attorney, Agent, or Firm* — Richard A. Wolf; Gregory Adams

(57) ABSTRACT

A tire tread (100) for a tire (101) comprising, a top side (10) configured to engage a ground surface during tire operation, a bottom side (20) configured for attachment to a tire carcass (105), a tread thickness (40) extending from the bottom side (20) to the top side (10) along a radial direction (R), a first lateral side (50) connecting the top side (10) with the bottom side (20), a second lateral side (60) connecting the top side (10) with the bottom side (20), wherein the first lateral side (50) is spaced apart from the second lateral side (60) along an axial direction (A). The tire tread (100) further comprises a plurality of grooves (70) extending into the tread thickness (40) from the top side (10) and terminating within a first depth (71) of the tire tread (100) at a groove bottom (75). Furthermore, the tire tread (100) a first shoulder track (51) limited by the top side (10), the bottom side (20) and the first lateral side (50), a second shoulder track (61) limited by the top side (10), the bottom side (20) and the second lateral side (60), wherein the first shoulder track (51) and/or the second shoulder track (61) comprise a preset geometry for an improved pressure distribution, wherein the first shoulder track (51) comprises a first shoulder track width (55) and a first reduced tread thickness (41) with respect to the tread thickness (40) and/or wherein the second shoulder track (61) comprises a second shoulder track width (65) and a second reduced tread thickness (42) with respect to the tread thickness (40).

4 Claims, 2 Drawing Sheets

Figure 1:
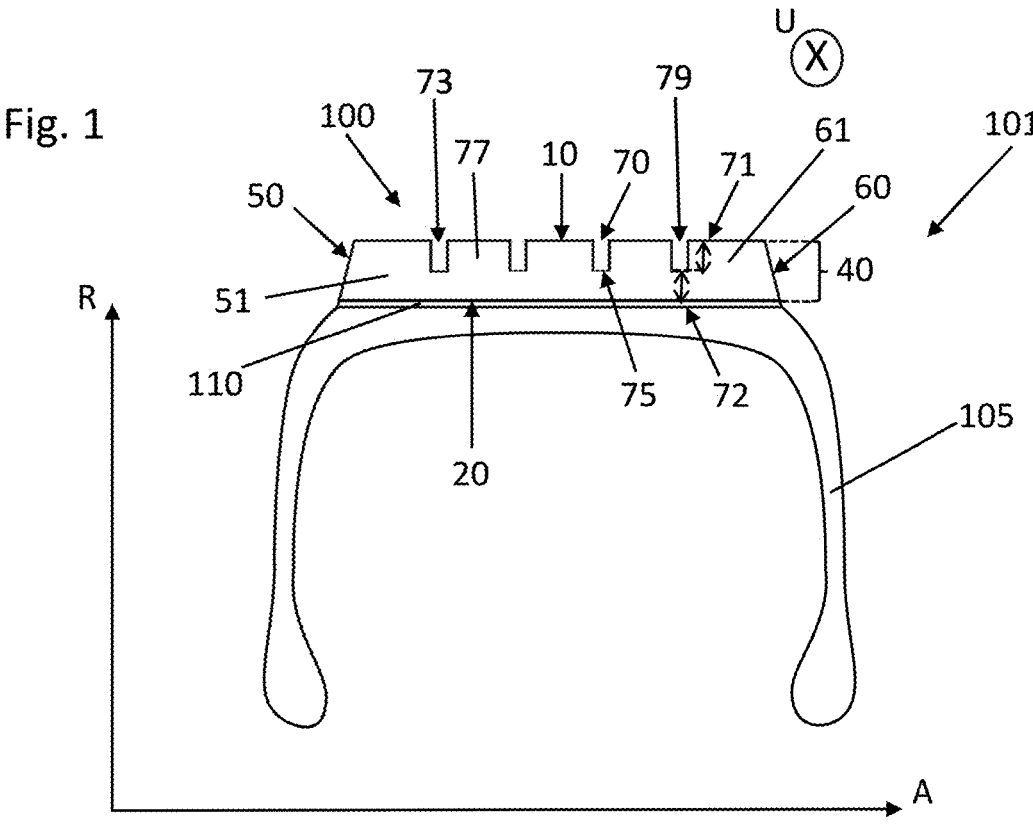

(51) Int. Cl.
  _B60C 11/02_    (2006.01)
  _B29D 30/06_    (2006.01)
  _B60C 11/03_    (2006.01)

(52) U.S. Cl.
  CPC ...... _B29D 30/56_ (2013.01); _B60C 2011/0341_
            (2013.01); _B60C 2200/06_ (2013.01)

(56)                References Cited

U.S. PATENT DOCUMENTS

| | | | |
|---|---|---|---|
| 2004/0007299 A1* | 1/2004 | Dresch | B60C 11/0083 |
| | | | 156/96 |
| 2012/0103485 A1* | 5/2012 | Colby | B29D 30/56 |
| | | | 156/95 |
| 2014/0020802 A1 | 1/2014 | Kleffman | |
| 2014/0261938 A1 | 9/2014 | Colby | |
| 2015/0129097 A1 | 5/2015 | Colby | |
| 2015/0283860 A1* | 10/2015 | Nagahara | B60C 11/0083 |
| | | | 152/209.1 |
| 2015/0328936 A1 | 11/2015 | Colby | |
| 2017/0021671 A1* | 1/2017 | Kitahara | B60C 9/0042 |
| 2017/0282650 A1 | 10/2017 | Neuber et al. | |
| 2024/0109372 A1* | 4/2024 | Gurumoorthy | B60C 11/01 |

FOREIGN PATENT DOCUMENTS

| | | | |
|---|---|---|---|
| EP | 1027982 A2 | 8/2000 |
| EP | 3415342 A1 | 12/2018 |
| FR | 1025115 A | 4/1953 |
| JP | 2013112218 A | 6/2013 |

* cited by examiner

Fig. 3

Fig. 4

TIRE TREAD FOR A TIRE AND TIRE AND CURING MOULD TO MANUFACTURE A TIRE TREAD

The disclosure relates to a tire tread for a tire. The disclosure further relates to a tire for a vehicle and a curing mould to manufacture a tire tread.

A tire for a vehicle, which can also be referred to as "vehicle tire", "motor vehicle tire" or "pneumatic tire", has a tread. This is an outer, circumferential surface with which the tire can roll on a surface. The tire can be mounted on a rim.

It is desirable to provide a tire that can be reliably and efficiently built. It is further desirable to provide a tire tread with improved performance. It is further desirable to provide a curing mould to manufacture a tire tread for a tire.

Embodiments of the disclosure relate to a tire tread for a tire. The tire comprises a tire casing. The tire comprises the tire tread. The tire tread comprises a running surface. In particular, the tire tread is configured to roll on a surface during operation. Embodiments of the disclosure further relate to a curing mould for manufacturing the tire tread.

In particular, the tread is a so-called precured tread for a cold retreading process. The tire carcass, for example, is the tire casing of a worn tire which is buffed such that an old tread is removed. The new tread is the precured tread which is provided separately during manufacturing of the tire and is fixed to the tire carcass by a bonding layer comprising a cushion gum. The precured tread is produced in a mould with a specific geometry depending on the application and performance requirements. The tire tread extends in a mounted state in the direction of rotation of the vehicle tire.

Retreading, which is also known as remoulding, is the process of recycling a tire that is worn, but still has enough of a solid structure so that the treads can be replaced.

There are two main retreading processes: mould cure retreading, which can also be referred to as hot retreading. And precure retreading, which can also be referred to as cold retreading. Retreading tires is economical and environmentally friendly.

When using the mould cured or remould process, raw i.e., unvulcanised, rubber is wrapped around the tire in one continuous strip similar to manufacturing of a new tire. Then, the tire is placed in a rigid mould to be cured.

Precure retreading works by wrapping a new tread with the new tread design around the old tire casing and splicing it using a bonding agent with a cushion gum. The new tread has already been vulcanized, i.e., sulphur treated, and heat treated. The tire is then placed into a chamber to be cured.

Precured treads are produced in flat moulds and due to that, the final product has parallel top and bottom surfaces. During the retreading process, the worn tire is buffed to a specific contour and the cushion gum is applied. The contour and the cushion gum determine the contour of the final tire after application of the precured treads.

The tire tread comprises a top side configured to engage a ground surface during tire operation. The tire tread comprises a bottom side configured for attachment to a tire carcass. A tread thickness is extending from the bottom side to the top side along a radial direction. The tread thickness is limited in its extension by the top side and the bottom side. The tire tread comprises a first lateral side connecting the top side with the bottom side and a second lateral side connecting the top side with the bottom side. The first lateral side is spaced apart from the second lateral side along an axial direction. The first lateral side and the second lateral side are two opposing lateral sides. The top side and the first lateral side intersect at a first point when the cross-section of the tire tread is viewed in the direction of rotation. Considering the whole tire tread, the first intersection point has the extension of a first intersection edge. The first intersection edge extends along the direction of rotation. The first intersection edge is, for example, angular or rounded with a defined radius of curvature.

The top side and the second lateral side intersect at a second point when the cross-section of the tire tread is viewed in the direction of rotation. Considering the whole tire tread, the second intersection point has the extension of a second intersection edge. The second intersection edge extends along the direction of rotation. The second intersection edge is, for example, angular or rounded with a defined radius of curvature.

The tread thickness is the thickness of the tread, which has the highest value across the tire tread. The highest value of the thickness is, for example, at the centre of the tire tread. The centre of the tire tread is a region between the first lateral side and the second lateral side. The centre of the tire tread is, for example, equidistant from the first lateral side and from the second lateral side. The tread thickness is measured in an area of the tread where no groove is located.

The tire tread further comprises a plurality of grooves extending into the tread thickness from the top side. The plurality of grooves is terminating within a first depth of the tire tread at a groove bottom. The groove bottom is spaced apart from the bottom side of the tire tread by a second depth. The cross section of the grooves, when viewed from the direction of rotation of the vehicle tire, can have any polygonal shape. The shape is for example rectangular, trapezoidal, or triangular. The shape is not limited to these polygonal shapes, the grooves can for example have a complex geometry, where for example the width of the grooves is varying several times in radial direction. The grooves have the same or different cross sections.

These grooves can extend in a longitudinal direction, which is in the direction of rotation of the vehicle tire, which is a 0° direction. Grooves can also extend in a lateral direction, which is in an axial direction of the vehicle tire, and which is perpendicular to the direction of rotation of the vehicle tire, which is a 90° direction. Grooves can also have inclined directions which are between 0° and 90° direction. Grooves can also have a varying or alternating direction over the circumference of the tire in direction of rotation.

The beginning of the numbering of the plurality of grooves is arbitrary and starts, for example, from the first lateral side and ends, for example, at the second lateral side. The numbering of the grooves continues along the axial direction. The first groove is the groove closest to the first lateral side, for example. The last groove is the groove closest to the second lateral side, for example.

The number of grooves is not limited to two grooves and comprises, for example, three grooves, four grooves, five grooves or even more grooves. A tire tread portion is located between two adjacent grooves.

The tire tread comprises a first shoulder track limited by the top side, bottom side and the first lateral side. The tire tread further comprises a second shoulder track limited by the top side, the bottom side and the second lateral side. The first shoulder track and/or the second shoulder track comprise a preset geometry for an improved pressure distribution.

A preset geometry in this context is, for example, a shape of the first shoulder track and the second shoulder track. The shoulder tracks can take any shape, for example, of a polyhedron. The shape of the shoulder tracks is not limited to polyhedrons. For example, the shoulder tracks can feature edges and corners. Furthermore, the shoulder tracks can be patterned. The shoulder tracks comprise, for example, indentations and protrusions. The edges of these indentations and protrusions can have sharp corners and edges or rounded corners and edges. The shape and pattern of the shoulder tracks and the pattern of the tire tread form the so-called footprint. The footprint is the contact area between the tire tread and the surface on which the tire rolls, like a road.

The preset geometry of the shoulder tracks improves the pressure distribution on the tire tread. The pressure distribution is improved, for example, in the region of the shoulder tracks. The shape and pattern of the shoulder tracks are modified, such that the pressure has a lower focus on the first shoulder track and/or the second shoulder track. Furthermore, the shape and pattern of the tire tread can be modified for an improved performance of the tire tread.

The buffed contour is often flatter than a new tire tread contour. The buffed contour is limited through tire specific boundaries. For example, buffing machine limitations, varying casing and belt dimensions due to growth variations during the tire life. Furthermore, it should be avoided to buff into the belts.

These effects usually lead to much flatter tread contour of the final retreaded tire compared to the tread contour of a new tire. By modifying the geometry of the first and/or second shoulder track of the precured tread, the performance is improved by avoiding flattening the contour of the tire tread too much. The modification of the geometry decreases, for example, the pressure on the first and/or second shoulder track during operation of the tire. The corresponding footprint, shape or pattern of the tire tread is less rectangular or less butterfly-shaped. Butterfly-shaped means in this context a bigger tread thickness at the first lateral side and at the second lateral side than in the center of the tire tread.

The increased performance of the tire tread due to the preset geometry, particularly of the first and/or second shoulder track has a positive impact. For example, the rolling resistance, the crown endurance, the belt endurance and/or the wear shape are improved.

The first shoulder track comprises a first shoulder track width and a first reduced tread thickness with respect to the tread thickness and/or the second shoulder track comprises a second shoulder track width and a second reduced tread thickness with respect to the tread thickness.

The first reduced tread thickness and the second reduced tread thickness are smaller than the tread thickness of the tire tread. The first reduced tread thickness is, for example, as big as the second reduced tread thickness. Alternatively, the first reduced tread thickness is bigger than the second reduced tread thickness. Alternatively, the first reduced tread thickness is smaller than the second reduced tread thickness.

The shoulder track width is the width of the shoulder track at the top side of the tread tire. The first shoulder track width is measured from the first lateral side to the first groove of the plurality of grooves along the axial direction. The second shoulder track width is measured from the second lateral side to the last groove of the plurality of grooves along the axial direction.

For example, the first reduced tread thickness of the first shoulder track has the same value across the whole first shoulder track width. The first shoulder track width extends along the top side. Alternatively, the first reduced tread thickness of the first shoulder track has different values across the whole first shoulder track width. For example, the first reduced tread thickness is sloped or curved.

For example, the second reduced tread thickness of the second shoulder track has the same value across the whole second shoulder track width. The second shoulder track width extends along the top side. Alternatively, the second reduced tread thickness of the second shoulder track has different values across the whole second shoulder track width. For example, the second reduced tread thickness is sloped or curved.

Optimized products are provided to customers with an improved lowest overall driving costs (LODC) for the customers, as the tire rolling resistance is improved which results in a reduction of tire related vehicle energy or fuel consumption. The value of the reduced tread thickness is defined based on the application and position of a tire, for example on a truck.

The preset geometry and modification of the tire treads can be applied to all precured treads in all regions without any restrictions. The modified precured treads can be used for drive wheels, trailer wheels and/or steering wheels. The improved tire tread is used for example for all commercial vehicle tires.

According to an embodiment the first reduced tread thickness and/or the second reduced tread thickness include values in a value range from 50% to 99% of the tread thickness, preferably the values of the first reduced tread thickness and/or the second reduced tread thickness are in a value range from 50% to 95% of the tread thickness, more preferably in a value range between 50% and 90% of the tread thickness, even more preferably in a value range between 55% and 85%. The upper and lower limit of 50% to 99% are included. The values can take any percentage value that is in the value range. For example, the reduced tread thickness has a value of 50%, 51%, 52%, 53%, 54%, 55%, 65%, 75%, 85%, 95%, 96%, 97%, 98%, 99% of the tread thickness. The value of the reduced thickness is not limited to the mentioned percentages and can take any value in between the mentioned percentages.

A value of 50% of the tread thickness means in this context half of the tread thickness. A value of 99% of the tread thickness means in this context that the tread thickness is reduced by one percent. The thickness is reduced from the top side of the tire tread to the bottom side of the tire tread along the radial direction.

Rolling resistance optimized tires benefit from this solution via optimization of the preset geometry at the shoulder track. The geometry or shape of the shoulder tracks influences the footprint. Due to lowering of the pressure on the shoulder track, heat build-up and corresponding tire endurance is also be improved.

According to an embodiment the first shoulder track comprises a first chamfer extending from the first lateral side to the top side. Additionally, or alternatively, the second shoulder track comprises a second chamfer extending from the second lateral side to the top side.

The first chamfer and the second chamfer have the same absolute value of the slope. Alternatively, the absolute value of the slope of the first chamfer is bigger than the absolute value of the slope of the second chamfer. Alternatively, the absolute value of the slope of the first chamfer is smaller than the absolute value of the slope of the second chamfer. The slope is defined as the decreasing thickness of the tire tread along the shoulder track width with respect to the tread thickness. The chamfer extends basically along the whole vehicle tire in direction of rotation of the vehicle tire.

According to an embodiment the first chamfer begins in a first area, which extends from 10% of the first shoulder track width to 90% of the first shoulder track width. Preferably the first chamfer begins in the first area, which extends from 15% of the first shoulder track width to 85% of the first shoulder track width. More preferably the first chamfer begins in the first area, which extends from 20% of the first shoulder track width to 80% of the first shoulder track width. Even more preferably the first chamfer begins in the first area, which extends from 25% of the first shoulder track width to 75% of the first shoulder track width. The upper and lower limit of 10% to 90% are included. The values for the extension of the first area can take any percentage value that is in the above-described value range. Alternatively, or additionally the second chamfer begins in a second area, which extends from 10% of the second shoulder track width to 90% of the second shoulder track width. Preferably the second chamfer begins in the second area, which extends from 15% of the second shoulder track width to 85% of the second shoulder track width. More preferably the second chamfer begins in the second area, which extends from 20% of the second shoulder track width to 80% of the second shoulder track width. Even more preferably the second chamfer begins in the second area, which extends from 25% of the second shoulder track width to 75% of the second shoulder track width. The upper and lower limit of 10% to 90% are included. The values for the extension of the second area can take any percentage value that is in the above-described value range.

The first chamfer begins for example at 10% of the first shoulder track width. The first chamfer begins for example at 90% of the first shoulder track width. The first chamfer begins at a value between 10% and 90% of the first shoulder track width. The lower and upper limit of 10% to 90% are included. The values can take any percentage value that is in the value range. For example, the first chamfer begins at a value of 10%, 11%, 12%, 13%, 14%, 15%, 25%, 35%, 45%, 55%, 56% 57%, 85%, 90% of the first shoulder track width. The value of the of the first shoulder track width is not limited to the mentioned percentages and can take any value in between the mentioned percentages.

The second chamfer begins for example at 10% of the second shoulder track width. The second chamfer begins for example at 90% of the second shoulder track width. The second chamfer begins at a value between 10% and 90% of the second shoulder track width. The lower and upper limit of 10% to 90% are included. The values can take any percentage value that is in the value range. For example, the second chamfer begins at a value of 10%, 11%, 12%, 13%, 14%, 15%, 25%, 35%, 45%, 55%, 56% 57%, 85%, 90% of the second shoulder track width. The value of the second shoulder track width is not limited to the mentioned percentages and can take any value in between the mentioned percentages.

The first area and/or the second area extend substantially along the direction of rotation.

According to an embodiment the first chamfer ends in a third area, which extends from 50% of the tread thickness to 90% of the tread thickness. Preferably the first chamfer ends in the third area, which extends from 55% of the tread thickness to 85% of the tread thickness. More preferably the first chamfer ends in the third area, which extends from 60% of the tread thickness to 80% of the tread thickness. Even more preferably the first chamfer ends in the third area, which extends from 65% of the tread thickness to 75% of the tread thickness. The upper and lower limit of 50% to 90% are included. The values for the extension of the third area can take any percentage value that is in the above-described value range. Additionally, or alternatively, the second chamfer ends in a fourth area, which extends from 10% of the tread thickness to 90% of the tread thickness. Preferably the second chamfer ends in the fourth area, which extends from 55% of the tread thickness to 85% of the tread thickness. More preferably the second chamfer ends in the fourth area, which extends from 60% of the tread thickness to 80% of the tread thickness. Even more preferably the second chamfer ends in the fourth area, which extends from 65% of the tread thickness to 75% of the tread thickness. The upper and lower limit of 50% to 90% are included. The values for the extension of the fourth area can take any percentage value that is in the above-described value range.

The first chamfer ends for example at 50% of the tread thickness. The first chamfer ends for example at 90% of the tread thickness. The first chamfer ends at a value between 50% and 90% of the tread thickness. The lower and upper limit of 50% to 90% are included. The values can take any percentage value that is in the value range. For example, the first chamfer ends at a value of 10%, 11%, 12%, 13%, 14%, 15%, 25%, 35%, 45%, 55%, 56% 57%, 85%, 90% of the tread thickness. The value of the tread thickness is not limited to the mentioned percentages and can take any value in between the mentioned percentages.

The second chamfer ends for example at 50% of the tread thickness. The second chamfer ends for example at 90% of the tread thickness. The second chamfer ends at a value between 50% and 90% of the tread thickness. The lower and upper limit of 50% to 90% are included. The values can take any percentage value that is in the value range. For example, the second chamfer ends at a value of 10%, 11%, 12%, 13%, 14%, 15%, 25%, 35%, 45%, 55%, 56% 57%, 85%, 90% of the tread thickness.

The third area and/or the fourth area extend substantially along the direction of rotation.

Applying a chamfer at the shoulder tracks to the top side of the precured tread design facilitates an optimization of the footprint considering a fixed buffing radius and target casing. The resulting footprint shows an improved pressure distribution with a lower focus on the shoulder tracks. The specific extend of the percentage of the shoulder track width and reduction of tread depth, can be defined based on the target application, casing, buffing radius and tread design.

Tires that show significant uneven wear profit from the chamfered shoulder track since this gives another degree of freedom to optimize precured treads. Furthermore, tires that have a high heat-build-up at the belt edges benefit from the chamfered shoulder track due to the reduction of the amount of rubber. The source of the heat is further reduced due to a beneficial footprint.

According to an embodiment the first shoulder track comprises a first arcuated top side with a third reduced tread thickness with respect to the tread thickness and/or wherein the second shoulder track comprises a second arcuated top side with a third reduced tread thickness with respect to the tread thickness.

According to an embodiment the third reduced tread thickness decreases along the first arcuated top side in direction from the plurality of grooves to the first lateral side and/or the fourth reduced tread thickness decreases along the second arcuated top side in direction from the plurality of grooves to the second lateral side.

Applying a radius or contour at the shoulder tracks to the top side of the precured tread design facilitates an optimization of the footprint considering a fixed buffing radius and target casing. The resulting footprint shows an improved pressure distribution with a lower focus on the shoulder tracks. The specific contour of the shoulder track can be defined based on the target application, casing, buffing radius and tread design.

Tires that show significant uneven wear profit from the contoured shoulder track since this gives another degree of freedom to optimize precured treads. Furthermore, tires that have a high heat-build-up at the belt edges benefit from the arcuated top side due to the reduction of the amount of rubber. The source of the heat is further reduced due to a beneficial footprint. Tires that have high rolling resistance requirements benefit from the design due to the reduction of the pressure in the shoulder tracks.

According to an embodiment the top side of a tire tread portion between two adjacent grooves is arcuated.

Applying a radius or contour at the tire tread portion between two adjacent grooves to the top side of the precured tread design facilitates an optimization of the footprint considering a fixed buffing radius and target casing. The resulting footprint shows an improved pressure distribution with a lower focus on the shoulder tracks. The specific contour of the tire tread portion can be defined based on the target application, casing, buffing radius and tread design. Furthermore, a smooth transition between tire tread portions, grooves and shoulder tracks is possible.

A combination of different preset geometries of the shoulder tracks and tire tread is also possible. For example, the first and second shoulder tracks comprise a chamfered and contoured shoulder track with a reduced tread thickness. Optionally, the tire tread portion is contoured. Alternatively, the first shoulder track is contoured, and the second shoulder track is chamfered. Optionally, one or both shoulder tracks comprise a reduced tread thickness in addition to the above-mentioned modification. Alternatively, the first shoulder track has a reduced tread thickness, and the second shoulder track is chamfered or contoured. Alternatively, one shoulder track is modified, and the other shoulder track is not modified. In all embodiments, the first shoulder track and the second shoulder track can have the same reduced tread thickness, chamfer and contour. Alternatively, at least one of the reduced tread thickness, chamfer and contour of the first shoulder track and the second shoulder track are different.

A tire is provided comprising the tire tread according to any of the embodiments.

The tire comprises a tire carcass, a bonding layer and the tire tread. The bonding layer is arranged between the tire carcass and the tire tread. The bonding layer is configured to attach the tire carcass and the tire tread to each other. The tire carcass and the tire tread are attached to each other such that the running surface faces away from the tire carcass. For example, the bonding layer comprises a cushion gum or any other glue or epoxy that is configured to fix the tire tread on the tire carcass.

The design can be applied in all regions and to all precured tires. The modified precured treads can be used for drive wheels, trailer wheels and/or steering wheels. Rolling resistance optimized tires benefit from this solution via optimization of the footprint shape at the shoulder track. Tires having high rolling resistance requirements benefit from the design due to the reduction of the pressure in the shoulder track areas. Tires that show significant uneven wear profit from the design by receiving another degree of freedom to optimize the precured treads. Tires that have a high heat-build-up (HBU) at the belt edges benefit from the design due to the reduction of the amount of rubber and due to the reduction of the heat source due to beneficial footprint.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework for understanding the nature and character of the claims. The accompanying drawings are included to provide a further understanding and are incorporated in and constitute a part of this specification. The drawings illustrate one or more embodiments and, together with the description, serve to explain principles and operations of the various embodiments.

Figure 2:
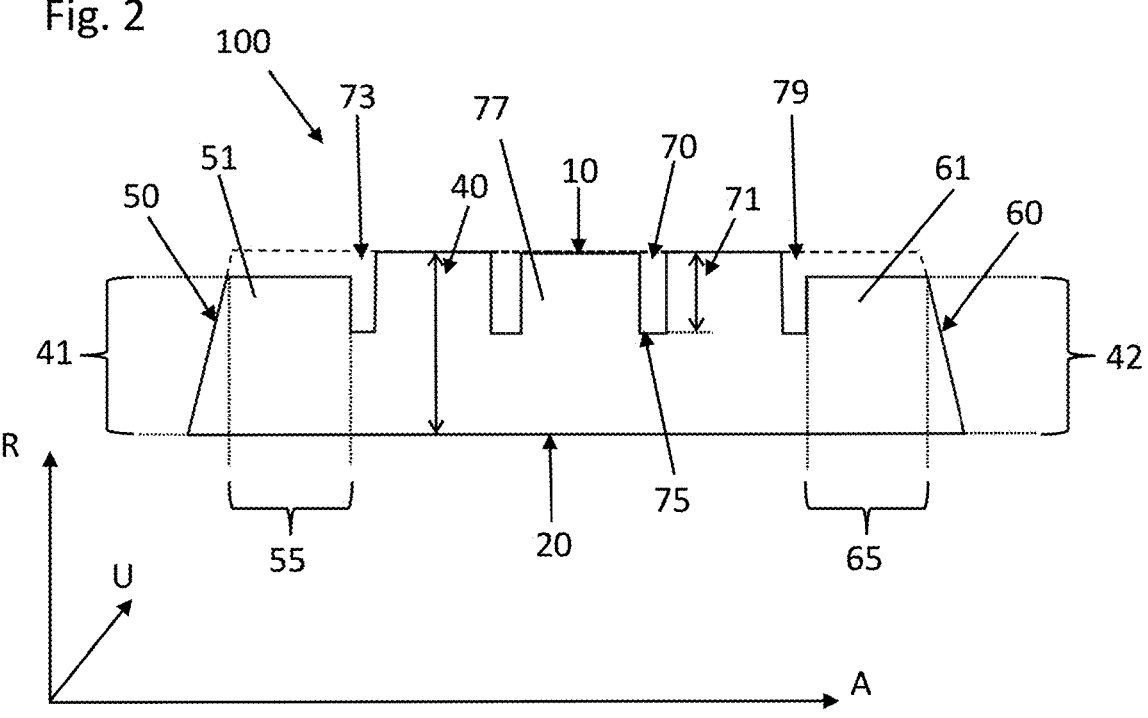
Figures 3, 4:
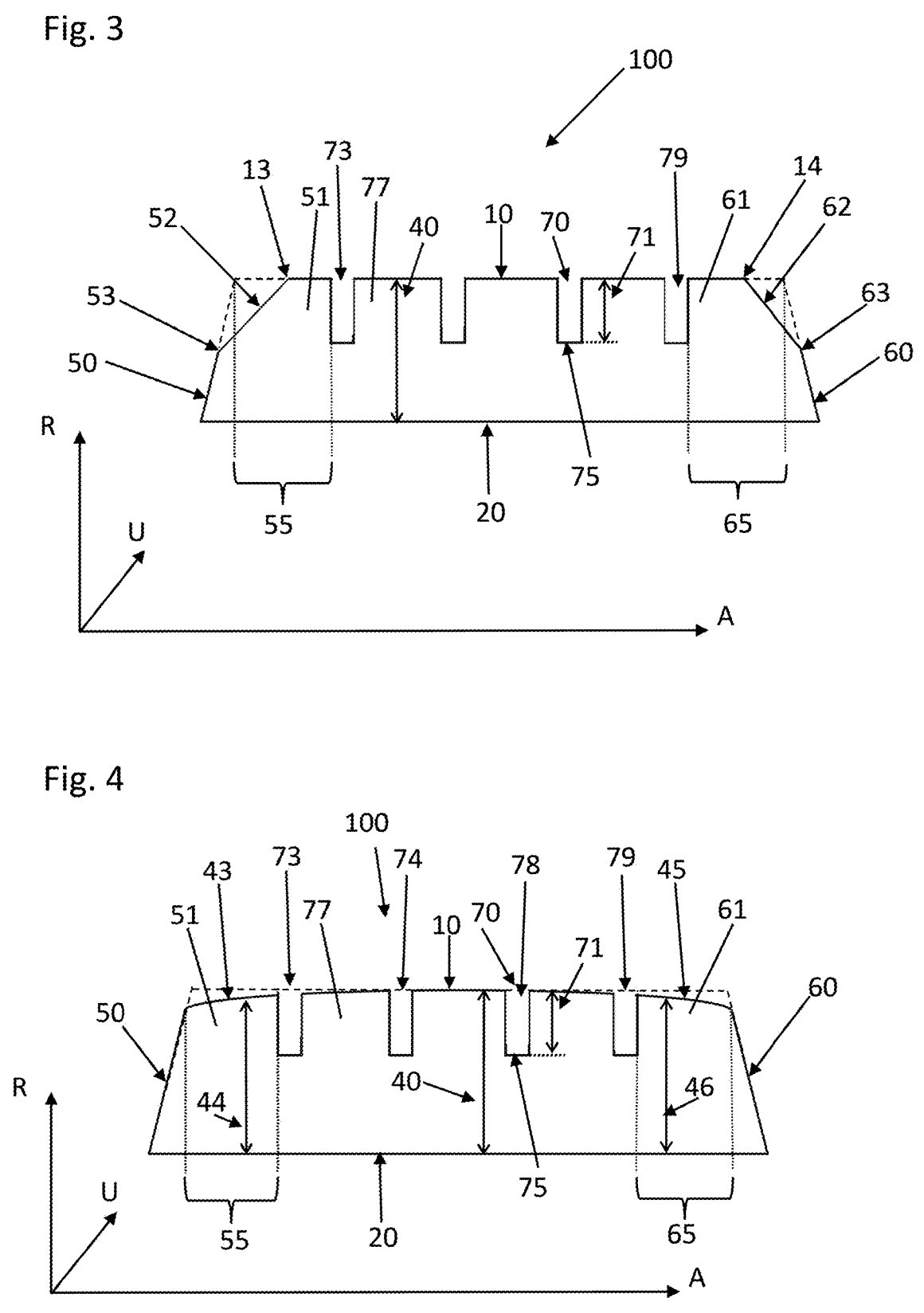

FIG. 1 is a schematic illustration of a part of a tire according to an embodiment, FIGS. 2 to 4 are each a schematic illustration of a tire tread according to embodiments.

Reference will now be made in detail to various embodiments, examples of which are illustrated in the accompanying drawings.

FIG. 1 shows a tire tread 100 for a tire 101. The tire 101 in particular is a retreaded tire which is built by a cold curing process. In particular, the tire 101 is a tire for a commercial vehicle like a truck and/or a bus. The tire 101 comprises a tire carcass 105. The tire carcass 105 can be mounted on a rim.

The tire 101 comprises the tire tread 100. The tread 100 in particular is a so-called precured tread. The tire tread 100 is fixed to the tire carcass 105 by a bonding layer 110. The bonding layer 110, for example, comprises a cushion gum to fix the tire tread 100 and the tire carcass 105 to each other. During manufacturing, the tire carcass 105 is provided in particular by reprocessing of an existing tire. The tire tread 100 is provided separately. The tire tread 100 in particular is a new and unused tread.

The tire tread 100 comprises a top side 10, also called a running surface, that rolls on the ground during operation, for example on a road. The top side 10 faces away from the tire carcass 105. The tire tread 100 comprises a bottom side 20 configured for attachment to the tire carcass 105. A tread thickness 40 is extending from the bottom 20 side to the top side 10 along a radial direction R. The tread thickness 40 is limited in its extension by the top side 10 and the bottom side 20. The tread thickness 40 is the thickness of the tire tread 100, which has the highest value across the tire tread 100. The highest value of the thickness is, for example, at the centre of the tire tread 100. The centre of the tire tread 100 is a region between a first lateral side 50 of the tire tread 100 and a second lateral side 60 of the tire tread 100. The centre of the tire tread 100 is, for example, equidistant from the first lateral side 50 and from the second lateral side 60. The first lateral side 50 connects the top side 10 with the bottom side 20 and the second lateral side 60 connects the top side 10 with the bottom side 20. The first lateral side 50 is spaced apart from the second lateral side 60 along an axial direction A. In particular, the axial direction A, and the radial direction R, are perpendicular to each other. The axial direction A, for example, corresponds to an axis of rotation of the tire 100. The first lateral side 50 and the second lateral side 60 are two opposing lateral sides.

The tire tread 100 further comprises a plurality of grooves 70 extending into the tread thickness 40 from the top side 10. The plurality of grooves 70 is terminating within a first depth 71 of the tire tread 100 at a groove bottom 75. The groove bottom 75 is spaced apart from the bottom side 20 of the tire tread 100 by a second depth 72.

The beginning of the numbering of the plurality of grooves 70 is arbitrary and starts, for example, from the first lateral side 50 and ends, for example, at the second lateral side 60. The numbering of the plurality of grooves 70 continues along the axial direction A. For example, the first groove 73 is the groove closest to the first lateral side 50. For example, the last groove 79 is the groove closest to the second lateral side 60.

The number of grooves is not limited to two grooves and comprises in FIG. 1, for example, four grooves. The tire tread 100 comprises alternatively three grooves, five grooves or even more grooves. A tire tread portion 77 is located between two adjacent grooves.

The cross section of the grooves 70, when viewed from the direction of rotation U of the vehicle tire 101, can have any polygonal shape. The shape is for example rectangular, trapezoidal, or triangular. The shape is not limited to these polygonal shapes. The grooves 70 have the same or different cross sections.

The tire tread 100 further comprises a first shoulder track 51 limited by the top side 10, the bottom side 20 and the first lateral side 50. The tire tread 100 further comprises a second shoulder track 61 limited by the top side 10, the bottom side 20 and the second lateral side 60. The first shoulder track 51 and the second shoulder track 61 extend basically along the whole vehicle tire 100 in a direction of rotation U of the vehicle tire 100. The first shoulder track 51 and/or the second shoulder track 61 comprise a preset geometry for an improved pressure distribution.

A preset geometry in this context is, for example, a shape of the first shoulder track 51 and/or the second shoulder track 61. The shoulder tracks 51, 61 can take any shape, for example, of a polyhedron. The shape of the shoulder tracks 51, 61 is not limited to polyhedrons. For example, the shoulder tracks 51, 61 feature corners and edges. Furthermore, the shoulder tracks 51, 61 can be patterned. The shoulder tracks 51, 61 comprise, for example, indentations and protrusions. The edges of these indentations and protrusions can have sharp corners and edges or rounded corners and edges. This pattern is like a footprint.

The preset geometry of the shoulder tracks 51, 61 improves the pressure distribution of the tire tread 100. The pressure distribution is improved, for example, in the region of the shoulder tracks 51, 61. The shape and pattern of the shoulder tracks 51, 61 are modified, such that the pressure has a lower focus on the first shoulder track 51 and/or on the second shoulder track 61. Furthermore, the shape and pattern of the tire tread 100, for example, of the tire tread portion 77 can be modified for an improved performance of the tire tread 100.

The increased performance of the tire tread 100 due to the preset geometry, particularly of the first and/or second shoulder track 51, 61 has a positive impact. For example, the rolling resistance, the crown endurance, the belt endurance and/or the wear shape are improved. Especially, the performance of trailer tires, where the third axle is exposed to high scrub forces, is improved.

FIG. 2 shows a schematic illustration of an example of a tire tread 100. The tire tread 100 comprises the first shoulder track 51 with a first shoulder track width 55 and a first reduced tread thickness 41. The reduced tread thickness 41 is reduced in its thickness with respect to the tread thickness 40. The tire tread 100 comprises the second shoulder track 61 with a second shoulder track width 65 and a second reduced tread thickness 42. The reduced tread thickness 42 is reduced in its thickness with respect to the tread thickness 40.

The shoulder track width 55, 65 is the width of the corresponding shoulder track 51, 61 at the top side 10 of the tread tire 100. The first shoulder track width 55 extends from the first lateral side 51 to the first groove 73 of the plurality of grooves 70 along the axial direction A. The first shoulder track width 55 extends along the top side 10. The second shoulder track width 65 extends from the second lateral side 61 to the last groove 79 of the plurality of grooves 70 along the axial direction A. The second shoulder track width 65 extends along the top side 10.

The first reduced thickness 41 of the first shoulder track 51 has the same value across the whole first shoulder track width 55. The second reduced thickness 42 of the second shoulder track 61 has the same value across the whole second shoulder track width 65.

The first reduced tread thickness 41 and the second reduced tread thickness 42 are smaller than the tread thickness 40 of the tire tread 100. In FIG. 2 the first reduced tread thickness 41 is as big as the second reduced tread thickness 42. Alternatively, the first reduced tread thickness 41 is bigger than the second reduced tread thickness 42. Alternatively, the first reduced tread thickness 41 is smaller than the second reduced tread thickness 42. The reduced tread thickness 41, 42 extends basically along the whole vehicle tire 100 in the direction of rotation U of the vehicle tire 100. The dashed lines at the first and second shoulder tracks 51, 61 indicate the tire tread 100 without a modified preset geometry.

The cost of modifying moulds for producing the precured treads with a preset geometry is not significantly higher. Therefore, optimized products are provided to customers with an improved lowest overall driving costs (LODC) for the customers. The value of the reduced tread thickness 41, 42 is defined based on the application and position of a tire, for example on a truck. The reduced tread thickness 41, 42 of the first and/or second shoulder track 51, 61 has a significant benefit, for example, on the third axle of a truck. By reducing the pressure at the shoulder tracks 51, 61 the corresponding forces are better split and the lifespan of the tire 100 can be increased.

The preset geometry and modification of the tire treads 100 can be applied to all precured treads in all regions of a vehicle without any restrictions. The modified precured treads can be used for drive wheels, trailer wheels and/or steering wheels. The improved tire tread 100 is used for example for all commercial vehicle tires.

FIG. 3 shows a schematic illustration of an example of a tire tread 100. The tire tread 100 comprises the first shoulder track 51 with a first chamfer 52 extending from the first lateral side 50 to the top side 10. The tire tread 100 comprises the second shoulder track 61 with a second chamfer 62 extending from the second lateral side 60 to the top side 10.

In FIG. 3 the first chamfer 52 and the second chamfer 62 have the same absolute value of the slope. Alternatively, the absolute value of the slope of the first chamfer 52 is bigger than the absolute value of the slope of the second chamfer 62. Alternatively, the absolute value of the slope of the first chamfer 52 is smaller than the absolute value of the slope of the second chamfer 62. The slope is defined as the decreasing thickness of the tire tread 100 along the respective shoulder track width 55, 60 with respect to the tread thickness 40. The chamfer 52, 62 extends basically along the whole vehicle tire 100 in the direction of rotation U of the vehicle tire 100 during operation.

The dotted line at the first shoulder track 51 and the second shoulder track 61 indicates the first shoulder track width 55 and the second shoulder track width 65 before applying the chamfer. The dashed lines at the first and second shoulder tracks 51, 61 indicate the tire tread 100 without a modified preset geometry. Based on these shoulder track widths 55, 65 the first chamfer 52 begins in a first area 13. The first area 13 extends from 10% of the first shoulder track width 55 to 90% of the first shoulder track width 55. The first chamfer 52 ends in a third area 53. The third area 53 extends from 50% of the tread thickness 40 to 90% of the tread thickness 40.

The second chamfer 62 begins in a second area 14. The second area 14 extends from 10% of the second shoulder track width 65 to 90% of the second shoulder track width 65. The second chamfer 62 ends in a fourth area 63. The fourth area 63 extends from 50% of the tread thickness 40 to 90% of the tread thickness 40.

Applying a chamfer 52, 62 at the respective shoulder tracks 51, 61 to the top side 10 of the precured tire tread 100 facilitates an optimization of the footprint considering a fixed buffing radius and target casing. The resulting footprint shows an improved pressure distribution with a lower focus on the shoulder tracks 51, 61. The specific extend of the percentage of the shoulder track width 55, 60 and reduction of tread thickness 40, can be defined based on the target application, casing, buffing radius and tread design.

Tires that show significant uneven wear, profit from the chamfered shoulder tracks 51, 61 since this gives another degree of freedom to optimize precured treads. Furthermore, tires that have a high heat-build-up at the belt edges benefit from the chamfered shoulder tracks 51, 61 due to the reduction of the amount of rubber. The source of the heat is further reduced due to a beneficial footprint.

FIG. 4 shows a schematic illustration of an example of a tire tread 100. The tire tread 100 comprises the first shoulder track 51 with a first arcuated top side 43 and with a third reduced tread thickness 44 with respect to the tread thickness 40. The third reduced tread thickness 44 varies across the first arcuated top side 43. The third reduced tread thickness 44 decreases along the first arcuated top side 43 in direction from the plurality of grooves 70 to the first lateral side 50.

The tire tread 100 comprises the second shoulder track 61 with a second arcuated top side 45 and with a fourth reduced tread thickness 46 with respect to the tread thickness 40. The fourth reduced tread thickness 46 varies across the second arcuated top side 45. The fourth reduced tread thickness 46 decreases along the second arcuated top side 45 in direction from the plurality of grooves 70 to the second lateral side 60.

In FIG. 4 the top side 10 is shown in an elongated form by a dashed line to highlight the varying distance between the top side 10 and the arcuated top sides 43, 45. The dashed lines at the first and second shoulder tracks 51, 61 indicate the tire tread 100 without a modified preset geometry.

Applying a radius or contour at the shoulder tracks 51, 61 to the top side 10 of the tire tread 100 facilitates an optimization of the footprint considering a fixed buffing radius and target casing. The resulting footprint shows an improved pressure distribution with a lower focus on the shoulder tracks 51, 61. The specific contour of the shoulder tracks 51, 61 can be defined based on the target application, casing, buffing radius and tread design.

Tires that show significant uneven wear profit from the contoured shoulder tracks 51, 61 since this gives another degree of freedom to optimize precured treads. Furthermore, tires that have a high heat-build-up at the belt edges benefit from the arcuated top sides 43, 45 due to the reduction of the amount of rubber. The source of the heat is further reduced due to a beneficial footprint. Tires that have high rolling resistance requirements benefit from the design due to the reduction of the pressure in the shoulder tracks 51, 61.

Furthermore, the top side 10 of the tire tread portion 77 between two adjacent grooves 70 is arcuated. In FIG. 4 the tire tread portion 77 between the first groove 73 and a second groove 74 features the first arcuated top side 43. The third reduced tread thickness 44 of the tire tread portion 77 varies across the first arcuated top side 43. The third reduced tread thickness 44 decreases along the first arcuated top side 43 in direction from the second groove 74 to the first groove 73. The tire tread portion 77 between a second to last groove 78 and the last groove 79 features the second arcuated top side 45. The fourth reduced tread thickness 46 of the tire tread portion 77 varies across the second arcuated top side . The fourth reduced tread thickness 46 decreases along the second arcuated top side 45 in direction from the second to last groove 78 to the last groove 79.

Applying a radius or contour at the tire tread portion 77 between two adjacent grooves 70 to the top side 10 of the tire tread 100 facilitates an optimization of the footprint considering a fixed buffing radius and target casing. The resulting footprint shows an improved pressure distribution with a lower focus also on the tire tread 100 in regions that are spaced apart from the first and second shoulder tracks 51, 61. The specific contour of the tire tread portion 77 can be defined based on the target application, casing, buffing radius and tread design. Furthermore, a smooth transition between tire tread portions 77, grooves 70 and shoulder tracks 51, 61 is possible.

A combination of different preset geometries of the shoulder tracks 51, 61 and regions of the tire tread 100 that are spaced apart from the first and second shoulder tracks 51, 61 is also possible. For example, the first shoulder track 51 and the second shoulder track 61 comprise a chamfered and contoured shoulder track 51, 61 with a respective first and second reduced tread thickness 41, 42. Optionally, the tire tread portion 77 is contoured. Alternatively, the first shoulder track 51 is contoured, and the second shoulder track 61 is chamfered. Optionally, one or both shoulder tracks 51, 61 comprise the reduced tread thickness 41, 42 in addition to the above-mentioned modification. Alternatively, the first shoulder track 51 has the first reduced tread thickness 41, and the second shoulder track 61 is chamfered or contoured. Alternatively, the first shoulder track 51 is modified, and the second shoulder track 61 is not modified. In all embodiments, the first shoulder track 51 and the second shoulder track 61 can have the same reduced tread thickness, chamfer and contour. Alternatively, at least one of the first and second reduced tread thickness, chamfer and contour of the first shoulder track 51, the second shoulder track 61 and the tread portion 77 are different.

Any combination of the modifications of the first shoulder track and the second shoulder track is possible.

It will be apparent to those skilled in the art that various modifications and variations can be made without departing from the spirit or the scope of the invention.

REFERENCE SIGNS 100 tire tread
101 tire
105 tire carcass
110 bonding layer
10 top side
13 first area
14 second area

13

20 bottom side
40 tread thickness
41 first reduced tread thickness
42 second reduced tread thickness
43 first arcuated top side
44 third reduced tread
45 second arcuated top side
46 reduced tread thickness
50 first lateral side
51 first shoulder track
52 first chamfer
53 third area
55 first shoulder track width
60 second lateral side
61 second shoulder track
62 second chamfer
63 fourth area
65 second shoulder track width
70 plurality of grooves
71 first depth
72 second depth
73 first groove
74 second groove
75 groove bottom
77 tread portion
78 second to last groove
79 last groove
A axial direction
R radial direction
U direction of rotation

The invention claimed is:

1. A precured tread for a retread tire comprising:
a top side configured to engage a ground surface during
  tire operation,
a flat bottom side configured to bond to a flat bonding
  surface of a tire casing with a cushion gum,
a tread thickness extending from the bottom side to the top
  side,
a first lateral side connecting the top side with the bottom
  side,
a second lateral side connecting the top side with the
  bottom side, wherein the first lateral side is spaced apart
  from the second lateral side along an axial direction,
a plurality of grooves extending into the tread thickness
  from the top side and terminating within a first depth of
  the tire tread at a groove bottom,
a first shoulder track limited by the top side, the bottom
  side and the first lateral side,
a second shoulder track limited by the top side, the bottom
  side and the second lateral side,
wherein the first shoulder track and the second shoulder
  track comprise a preset geometry for an improved
  pressure distribution when the precured tread is bonded
  to the tire casing and forms the retread tire,

wherein, in an unbonded state when viewed in axial
  cross-section, the first shoulder track comprises a first
  shoulder track width and a first laterally outward por-
  tion with a reduced tread thickness with respect to the
  tread thickness in which this first laterally outward
  portion with reduced tread thickness is defined by the
  first lateral side, and wherein the second shoulder track
  comprises a second shoulder track width and a second
  laterally outward portion with a reduced tread thickness
  with respect to the tread thickness in which this second
  laterally outward portion with reduced tread thickness
  is defined by the second lateral side, and
wherein, in the unbonded state when viewed in axial
  cross-section, each of the first and second lateral sides
  has a lower inwardly sloped surface extending from the
  flat bottom side to an intermediate area between the top
  and bottom sides, and has a upper inwardly sloped
  surface extending from the intermediate area to the top
  side, the upper sloped surface having a greater inward
  slope than the lower sloped surface such that each of
  the first and second lateral sides has a convex profile in
  axial cross-section.

2. A retread tire comprising:
a tire casing having a flat bonding surface when viewed in
  axial cross-section,
the precured tread according to claim 1, and
a bonding layer arranged between the tire casing and the
  precured tread, wherein the bonding layer includes a
  cushion gum that bonds the flat bonding surface of the
  tire casing to the flat bottom side of the precured tread.

3. The precured tread according to claim 1, wherein each
lower inwardly sloped surface of the first and second lateral
sides is a planar surface defined by a lower chamfer of each
first and second lateral side, and wherein each upper
inwardly sloped surface of the first and second lateral sides
is a planar surface defined by an upper chamfer of each first
and second lateral side, wherein the intermediate area of
each first and second lateral side is an intermediate junction
edge defined by respective portions of the planar surfaces of
the upper and lower chamfers of the first and second lateral
sides, wherein the planar surface of the upper sloped surface
of the first lateral side defines a first area as measured from
the intermediate junction edge to the top side, in which this
first area extends from 25% to 75% of the first shoulder track
width, and wherein the planar surface of the upper sloped
surface of the second lateral side connects to the top side at
a second area, which extends from 25% to 75% of the
second shoulder track width.

4. The precured tread according to claim 3, wherein the
planar surface of the upper sloped surface of the first lateral
side extends from 55% to 85% of the tread thickness and
wherein the planar surface of the upper sloped surface of the
second lateral side extends from 55% to 85% of the tread
thickness.

* * * * *